United States Patent
Tsuruta et al.

(10) Patent No.: US 9,960,460 B2
(45) Date of Patent: May 1, 2018

(54) ENERGY STORAGE APPARATUS

(71) Applicant: GS Yuasa International Ltd., Kyoto-shi (JP)

(72) Inventors: Shogo Tsuruta, Kyoto (JP); Yuichiro Yamamoto, Kyoto (JP)

(73) Assignee: GS YUASA INTERNATIONAL LTD., Kyoto-Shi, Kyoto (JP)

(*) Notice: Subject to any disclaimer, the term of this patent is extended or adjusted under 35 U.S.C. 154(b) by 320 days.

(21) Appl. No.: 14/845,109

(22) Filed: Sep. 3, 2015

(65) Prior Publication Data
US 2016/0072159 A1   Mar. 10, 2016

(30) Foreign Application Priority Data
Sep. 4, 2014 (JP) ................. 2014-180649

(51) Int. Cl.
*H01M 10/48* (2006.01)
*H01M 2/10* (2006.01)

(52) U.S. Cl.
CPC ......... *H01M 10/48* (2013.01); *H01M 2/1016* (2013.01); *H01M 10/482* (2013.01)

(58) Field of Classification Search
CPC ... H01M 2/1016; H01M 10/48; H01M 10/482
See application file for complete search history.

(56) References Cited

U.S. PATENT DOCUMENTS

2010/0190050 A1    7/2010   Ochi
2012/0315508 A1*  12/2012   Kurita ................. H01M 2/1077
                                                                429/7

FOREIGN PATENT DOCUMENTS

| JP | 2002-042753 A | 2/2002 |
| JP | 2010-176997 A | 8/2010 |
| JP | 2012-064356 A | 3/2012 |
| JP | 2012-256467 A | 12/2012 |
| JP | 2013-020891 A | 1/2013 |

* cited by examiner

*Primary Examiner* — Brittany Raymond
(74) *Attorney, Agent, or Firm* — McGinn IP Law Group, PLLC.

(57) ABSTRACT

An energy storage apparatus includes: an energy storage device; a spacer disposed on one side of the energy storage device in a first direction, the spacer including a pair of wall portions; and a measuring part for measuring a state of the energy storage device, the measuring part disposed on one side of the energy storage device in a second direction which intersects with the first direction. The wall portions include a first wall portion disposed on the one side of the energy storage device in the second direction and a second wall portion disposed on the other side of the energy storage device opposite to the one side of the energy storage device. The energy storage device is arranged at a position where a distance between the energy storage device and the first wall portion is set shorter than a distance between the energy storage device and the second wall portion.

20 Claims, 12 Drawing Sheets

FIG. 5
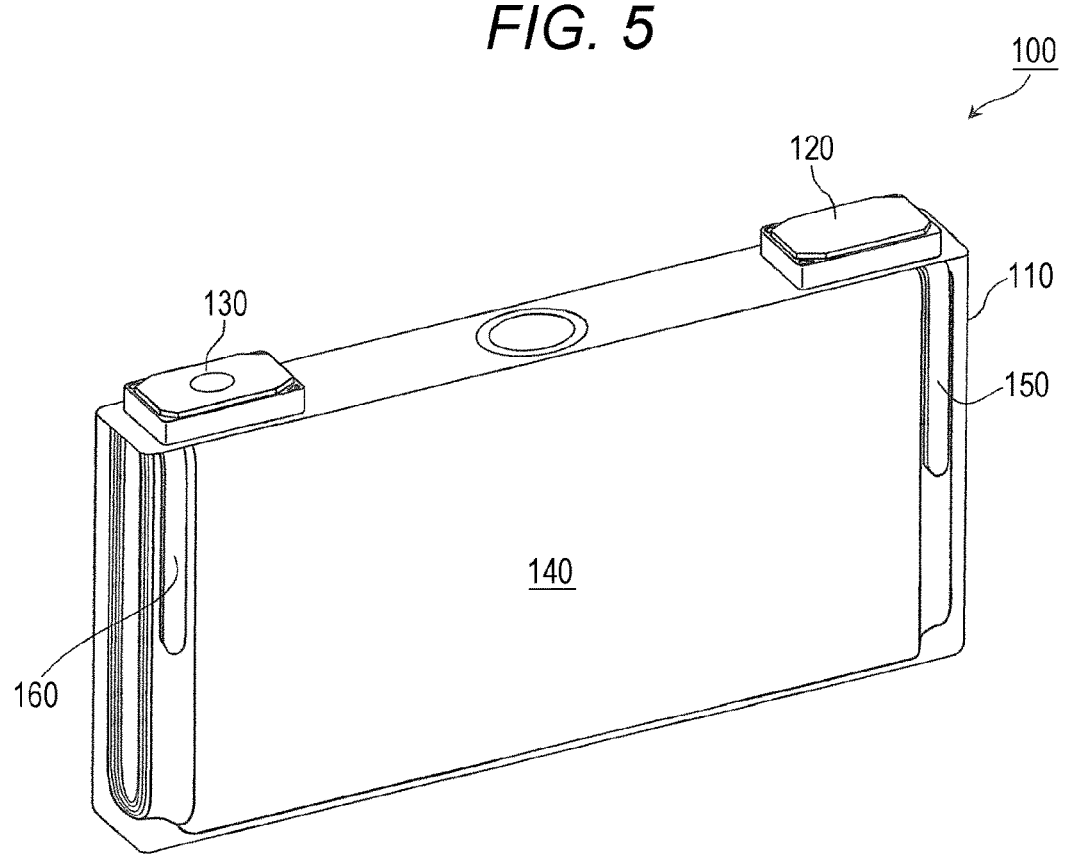
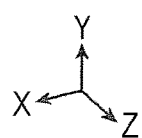

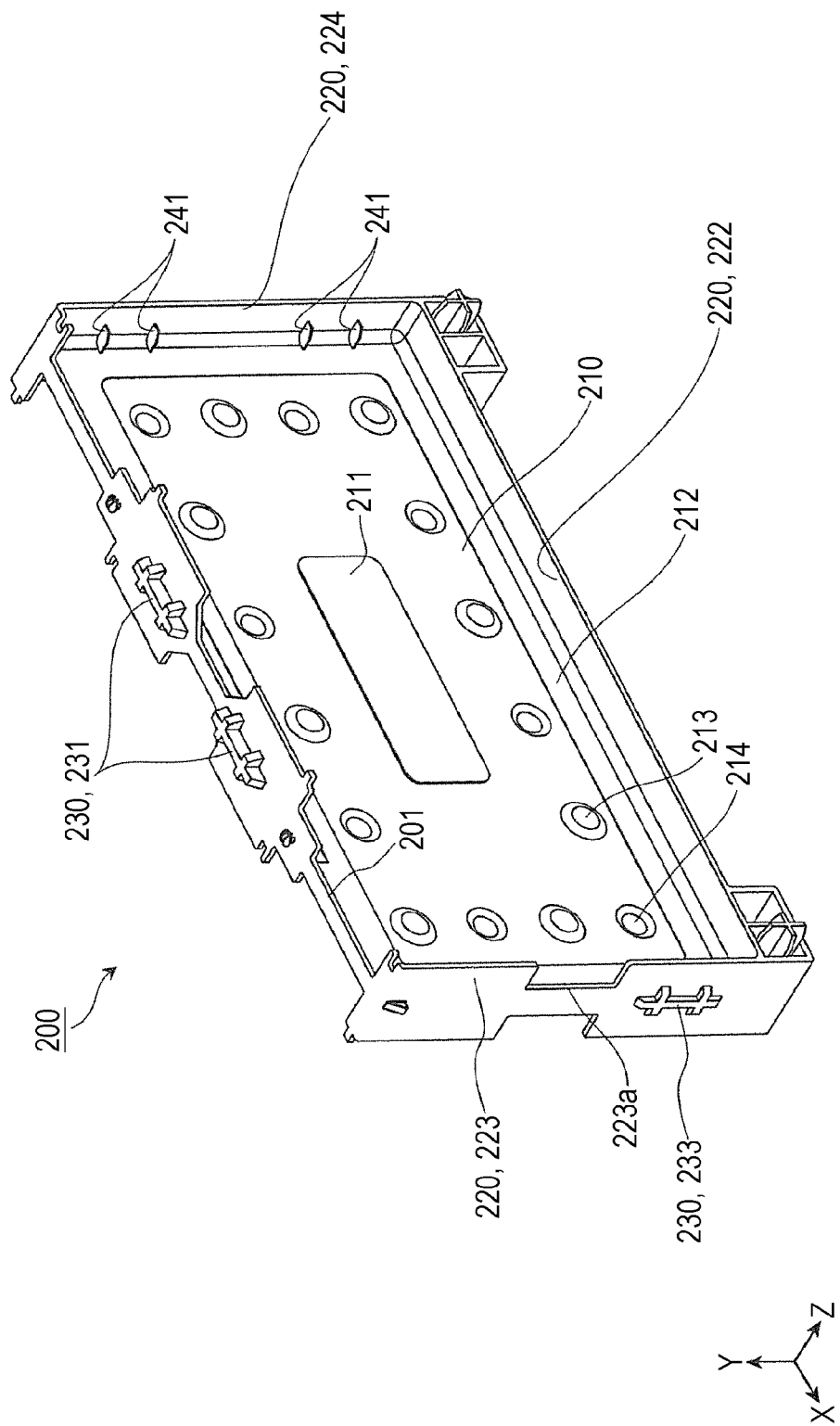

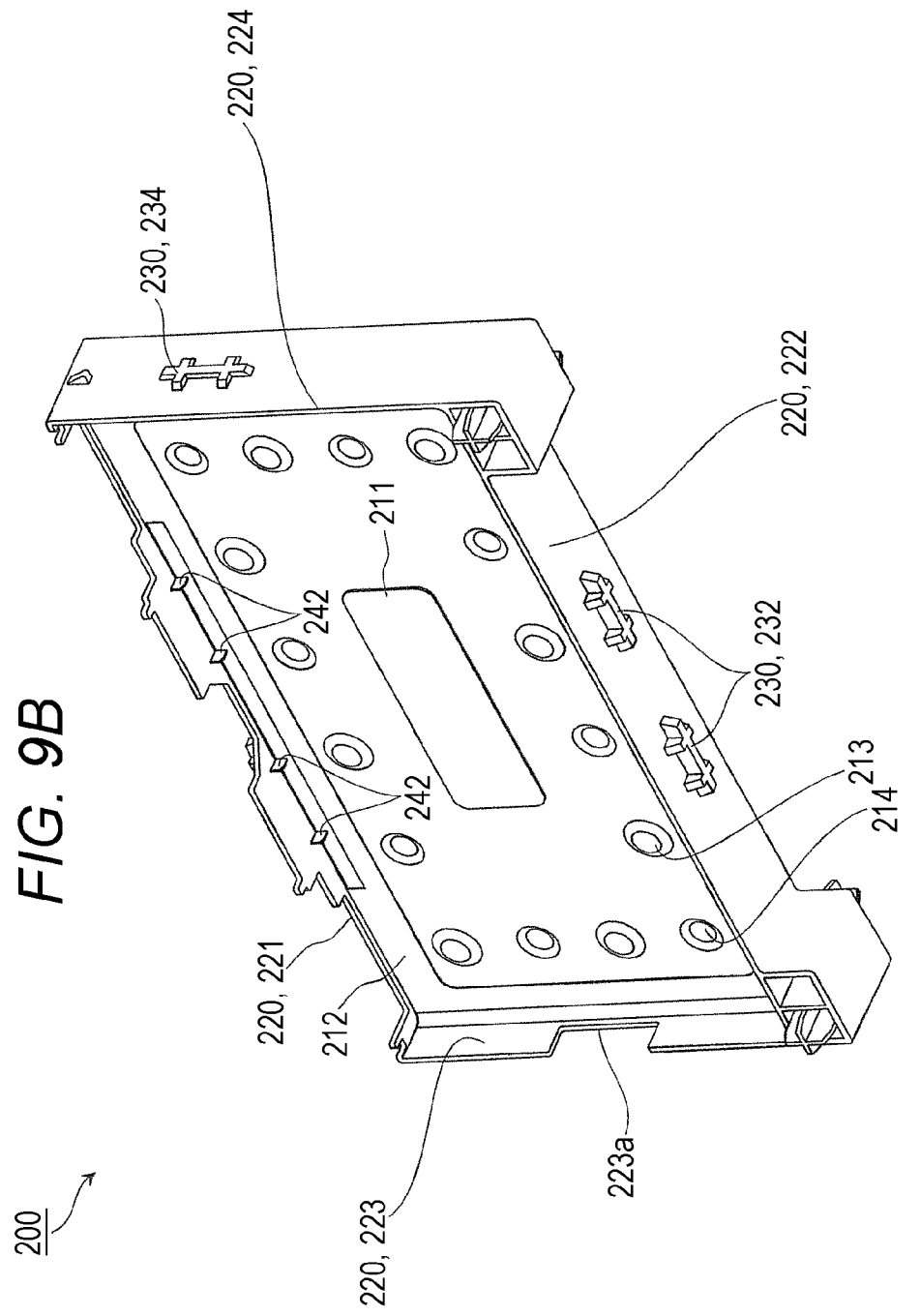

ENERGY STORAGE APPARATUS

CROSS-REFERENCE TO RELATED APPLICATIONS

This application claims the benefit of Japanese patent application No. 2014-180649, filed on Sep. 4, 2014, which is incorporated by reference.

FIELD

The present invention relates to an energy storage apparatus which includes energy storage devices and spacers disposed on sides of the energy storage devices.

BACKGROUND

Conventionally, in an energy storage apparatus (assembled battery) which includes a plurality of energy storage devices (battery cells), there has been known a configuration where spacers are provided for insulating the plurality of energy storage devices from each other (see JP-A-2013-20891). In the energy storage apparatus described in JP-A-2013-20891, a temperature sensor (temperature detector) for detecting a temperature of the energy storage apparatus is arranged on a side of the plurality of energy storage devices in a direction which intersects with a direction that the plurality of energy storage devices are arranged, and a detection result of the temperature sensor is used in control of the energy storage apparatus.

However, in the above-mentioned conventional energy storage apparatus, for example, when vibrations or impact is applied to the energy storage apparatus, the energy storage device and the temperature sensor are positionally displaced from each other and hence, the energy storage device and the temperature sensor are separated from each other or the temperature detector is disposed away from a desired position relative to the energy storage device thus giving rise to a possibility that a temperature of the energy storage device cannot be measured with high accuracy.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention to provide an energy storage apparatus which can measure a state of an energy storage device with high accuracy.

An energy storage apparatus according to an aspect of the present invention includes: an energy storage device; a spacer disposed on a side of the energy storage device in a first direction, the spacer including a pair of wall portions; and a measuring part for measuring a state of the energy storage device, the measuring part disposed on one side of the energy storage device in a second direction which intersects with the first direction, wherein the wall portions include a first wall portion disposed on one side of the energy storage device in the second direction and a second wall portion disposed on the other side of the energy storage device opposite to one side of the energy storage device, and the energy storage device is arranged at a position where a distance between the energy storage device and the first wall portion is set shorter than a distance between the energy storage device and the second wall portion.

BRIEF DESCRIPTION OF DRAWINGS

The foregoing and other features of the present invention will become apparent from the following description and drawings of an illustrative embodiment of the invention in which:

FIG. 5 is a perspective view showing a configuration of an energy storage device.

FIG. 9A is a perspective view showing a configuration of a spacer.

FIG. 9B is a perspective view showing a configuration of a spacer.

DESCRIPTION OF EMBODIMENT

Figure 1:
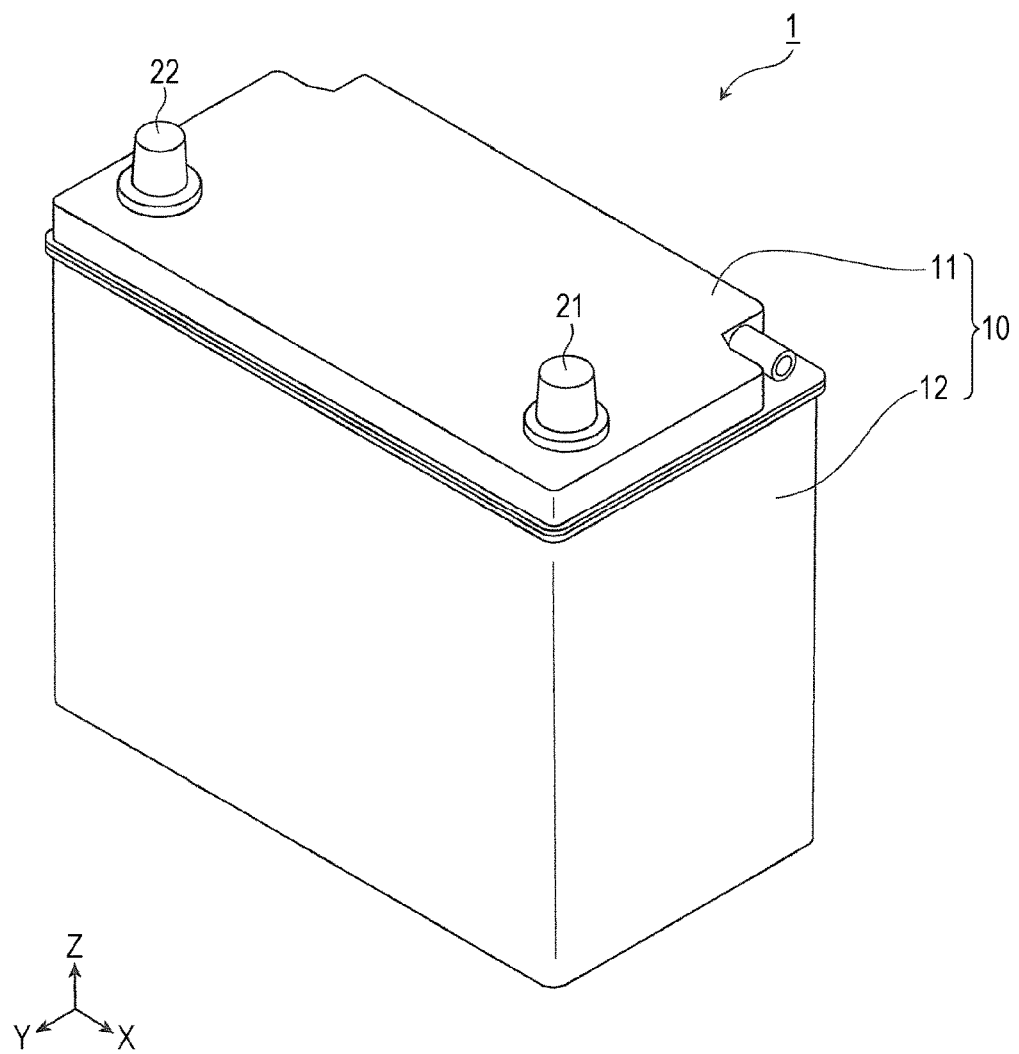
FIG. 1 is a perspective view showing an external appearance of an energy storage apparatus according to an embodiment of the present invention.

According to an aspect of the present invention, there is provided an energy storage apparatus which includes: an energy storage device; a spacer disposed on one side of the energy storage device in a first direction, the spacer including a pair of wall portions; and a measuring part for measuring a state of the energy storage device, the measuring part disposed on one side of the energy storage device in a second direction which intersects with the first direction, wherein the wall portions include a first wall portion disposed on the one side of the energy storage device in the second direction and a second wall portion disposed on the other side of the energy storage device opposite to the one side of the energy storage device, and the energy storage device is arranged at a position where a distance between the energy storage device and the first wall portion is set shorter than a distance between the energy storage device and the second wall portion.

With such a configuration, the energy storage device is arranged at a position where the energy storage device is more close to the first wall portion of the spacer on the one side in the second direction, where the measuring part is disposed, than the second wall portion of the spacer on the other side opposite to the one side in the second direction. Accordingly, it is possible to surely bring the energy storage device into a state where the energy storage device is disposed close to the measuring part. With such a configuration, the measuring part can measure a state of the energy storage device with high accuracy.

An opening portion may be formed in the first wall portion at a position where the measuring part is disposed.

With such a configuration, insulating property on the one side of the energy storage device in the second direction can be enhanced and hence, a state of the energy storage device can be measured by the measuring part easily with high accuracy.

The spacer may further include a protrusion arranged at a position where the protrusion is brought into contact with a surface of the energy storage device on the other side of the energy storage device in the second.

With such a configuration, the protrusion is formed on the spacer disposed on the one side of the energy storage device in the first direction at a position where the protrusion is brought into contact with the surface of the energy storage device on a side opposite to the surface of the energy storage device on which the measuring part is disposed and hence, the energy storage device can be arranged close to the wall portion of the spacer on the one side in the second direction. Accordingly, the energy storage device can be brought into a state where the energy storage device is disposed close to the measuring part. Accordingly, the measuring part can measure a state of the energy storage device with high accuracy.

The protrusion and the measuring part may be arranged at positions where the protrusion and the measuring part correspond to each other in the second direction.

With such a configuration, with the use of the spacer, the energy storage device can be disposed close to the measuring part at the position where the spacer corresponds to at least the measuring part.

The energy storage apparatus may further include two binding members for applying a binding force in the first direction between the energy storage device and the spacer, the two binding members being arranged on end portions of an assembled body including the energy storage device and the spacer on the one side of the assembled body in the second direction and the other side of the assembled body opposite to the one side of the assembled body in the second direction, wherein a first binding member arranged on the one side of the assembled body in the second direction out of the two binding members may be arranged on one side of the assembled body in a third direction which intersects with the first direction and the second direction relative to the measuring part, and a second binding member arranged on the other side of the assembled body opposite to the one side of the assembled body out of the two binding members may be arranged on the other side opposite to the one side in the third direction where the first binding member is arranged.

With such a configuration, the two binding members can be arranged at positions excluding a position where the measuring part is arranged. Accordingly, in disposing the measuring part on the one side of the energy storage device in the second direction, the measuring part can be arranged without causing the interference between the measuring part and the two binding members. Further, two binding members can uniformly apply a binding force between the energy storage device and the spacer over the whole widths of the energy storage device and the spacer in the third direction. Accordingly, the measuring part can measure a state of the energy storage device with high accuracy. Further, the two binding members can apply a binding force between the energy storage device and the spacer in a more stable manner.

The first binding member and the second binding member may be arranged approximately in point symmetry with respect to the center of the energy storage device.

With such a configuration, the two binding members can uniformly apply a binding force between the energy storage device and the spacer over the whole widths of the energy storage device and the spacer in the third direction. Accordingly, the two binding members can apply a binding force between the energy storage device and the spacer in a more stable manner.

The measuring part may comprise a temperature sensor which measures a temperature of the energy storage device.

With such a configuration, the measuring part can measure a temperature of the energy storage device with high accuracy.

The measuring part may be brought into contact with a side surface of the energy storage device at a position where the measuring part faces a current collector which the energy storage device includes.

With such a configuration, a temperature of a side surface of the energy storage device at a position where the energy storage device faces the current collector which easily generates heat can be measured. Accordingly, a temperature measured by the measuring part can be effectively used in various controls of the energy storage apparatus.

The measuring part may be brought into contact with the side surface of the energy storage device at a position where the measuring part faces in an opposed manner the current collector having a larger resistance out of a positive current collector and a negative current collector which constitute the current collector.

With such a configuration, a temperature of a side surface of the energy storage device at the position where the energy storage device faces the positive current collector which easily generates heat can be measured. Accordingly, a temperature measured by the measuring part can be effectively used in various controls of the energy storage apparatus.

The energy storage device may comprise three or more energy storage devices arranged in the first direction, a plurality of the spacers may be disposed between the three or more energy storage devices, the measuring part may be disposed on the side of an inner energy storage device in the second direction side, the inner energy storage device being arranged on an inner side out of the three or more energy storage devices, and the protrusion may be formed on the spacer which is brought into contact with the inner energy storage device out of the plurality of spacers.

With such a configuration, it is possible to surely bring the inner energy storage device, which easily increases a temperature thereof among the three or more energy storage devices, close to the measuring part. Accordingly, the measuring part can measure a temperature of the inner energy storage device with high accuracy.

The protrusion may be configured to apply a biasing force directed toward a measuring part side to the energy storage device.

With such a configuration, even when vibrations or an impact is applied to energy storage apparatus, the spacer can maintain a state where the energy storage device is disposed close to the measuring part.

The spacer may further include the other wall portion disposed on the other side of the energy storage device opposite to the one side of the energy storage device in the second direction, and a plurality of protrusions including the protrusion may be formed on the other wall portion.

With such a configuration, the energy storage device can be made close to the measuring part in a state where the energy storage device is not inclined in the second direction. That is, the measuring part can measure a state of the energy storage device using the surface of the energy storage device in a stable state and hence, the state of the energy storage device can be measured with high accuracy.

The present invention can be realized not only in the form of such an energy storage apparatus but also in the form of a spacer which the energy storage apparatus includes.

According to the aspects of the present invention, a state of the energy storage device can be measured with high accuracy.

Hereinafter, the energy storage apparatus according to the embodiment of the present invention is described with reference to drawings. The embodiment described hereinafter describes preferred specific examples of the present invention. In the embodiment described hereinafter, numerical values, shapes, materials, elements, arrangement positions and connection states of the elements and the like are merely examples, and these are not intended to be used for limiting the present invention. Further, out of the elements in the embodiment described hereinafter, the elements which are not described in the independent claim describing an uppermost concept are described as elements provided as appropriate. In the respective drawings, the respective elements are not always described strictly accurately in size or the like.

Embodiment

Firstly, a configuration of an energy storage apparatus 1 is described.

Figure 2:
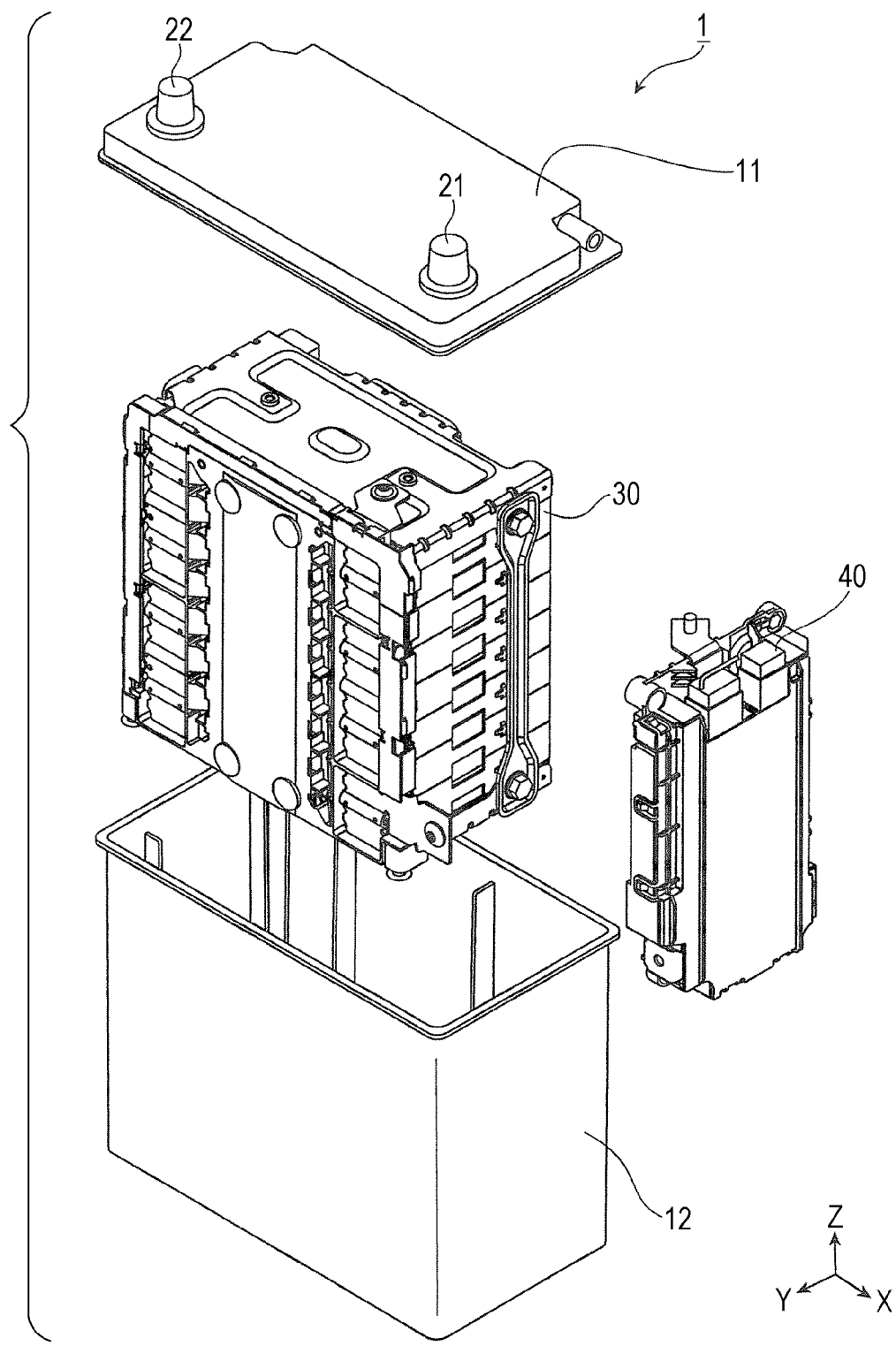
FIG. 2 is an exploded perspective view showing respective elements of the energy storage apparatus in an exploded manner.

FIG. 1 is a perspective view showing an external appearance of the energy storage apparatus 1 according to an embodiment of the present invention. FIG. 2 is an exploded perspective view showing respective elements of the energy storage apparatus 1 in an exploded manner.

In these figures, the Z axis direction is indicated as the vertical direction, and the description is made hereinafter using the Z axis direction as the vertical direction. However, there may be also a case where the Z axis direction is not the vertical direction depending on a mode of use and hence, the Z axis direction is not limited to the vertical direction.

The energy storage apparatus 1 is a device which is charged with electricity from the outside or can discharge electricity to the outside. For example, the energy storage apparatus 1 is a battery module used for power storage application, power source application or the like.

As shown in these drawings, the energy storage apparatus 1 includes: an outer covering 10 formed of a first outer covering 11 and a second outer covering 12; and an energy storage unit 30 and electric equipment 40 which are accommodated in the inside of the outer covering 10.

The outer covering 10 is a container (module case) having a rectangular shape (box shape) which is arranged outside the energy storage unit 30 and the electric equipment 40, and constitutes an outer covering of the energy storage apparatus 1. That is, in the outer covering 10, the energy storage unit 30 and the electric equipment 40 are arranged at predetermined positions, and the outer covering 10 protects the energy storage unit 30 and the electric equipment 40 from an impact or the like. The outer covering 10 is formed using an insulating resin such as polycarbonate or polypropylene (PP), for example, and prevents the energy storage unit 30 and the electric equipment 40 from coming into contact with a metal member or the like disposed outside the outer covering 10.

The outer covering 10 includes: the first outer covering 11 forming a lid member of the outer covering 10; and the second outer covering 12 forming a body of the outer covering 10. The first outer covering 11 is a cover member having a flat rectangular shape which closes an opening of the second outer covering 12. A positive external terminal 21 and a negative external terminal 22 are formed on the first outer covering 11. The energy storage apparatus 1 is charged with electricity from the outside or discharges electricity to the outside through the positive external terminal 21 and the negative external terminal 22. The second outer covering 12 is a bottomed rectangular cylindrical housing having the opening, and the energy storage unit 30 and the electric equipment 40 are accommodated in the second outer covering 12.

The first outer covering 11 and the second outer covering 12 may be formed using the same material, or may be formed using different materials.

The energy storage unit 30 includes a plurality of energy storage devices, and is connected to the positive external terminal 21 and the negative external terminal 22 formed on the first outer covering 11. In this embodiment, as shown in FIG. 2, the energy storage unit 30 is arranged in the second outer covering 12 in a state where a plurality of energy storage devices which are in a horizontally laid state are stacked in the Z axis direction. The energy storage unit 30 is covered by the first outer covering 11 from above so that the energy storage unit 30 is accommodated in the outer covering 10. The detailed configuration of the energy storage unit 30 is described later.

The electric equipment 40 is equipment having a rectangular shape in which a printed circuit board, a relay and the like are arranged, and the electric equipment 40 is arranged on the side (the plus side in the X axis direction) of the energy storage unit 30. In this embodiment, as shown in FIG. 2, the electric equipment 40 is arranged in the second outer covering 12 upright in the Z axis direction in a state where the printed circuit board is laid vertically. The electric equipment 40 is covered by the first outer covering 11 from above so that the electric equipment 40 is accommodated in the outer covering 10. The detailed configuration of the electric equipment 40 is described later.

Next, the configuration of the energy storage unit 30 is described in detail.

Figure 3:
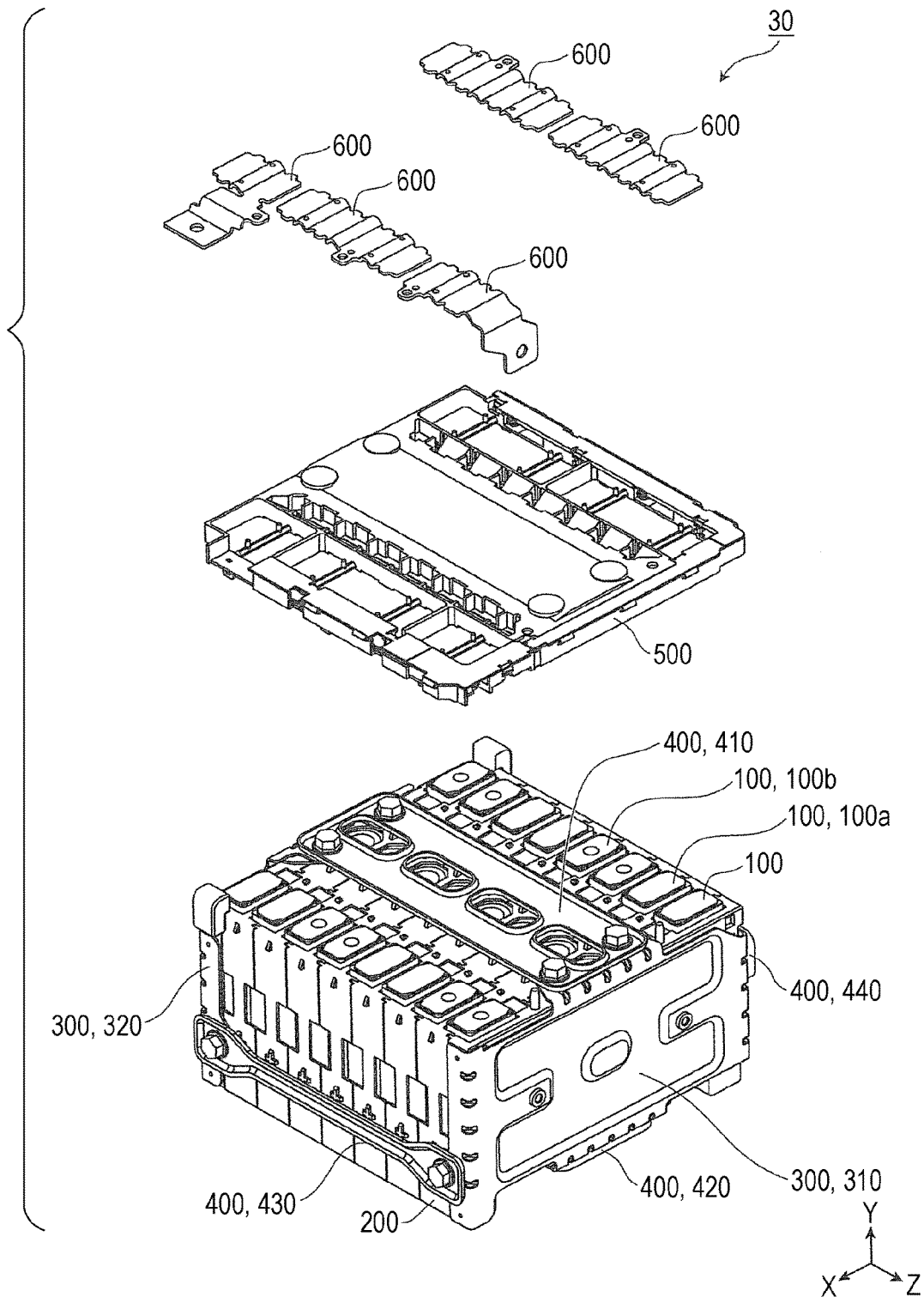
FIG. 3 is a perspective view showing a configuration of an energy storage unit.
Figure 4:
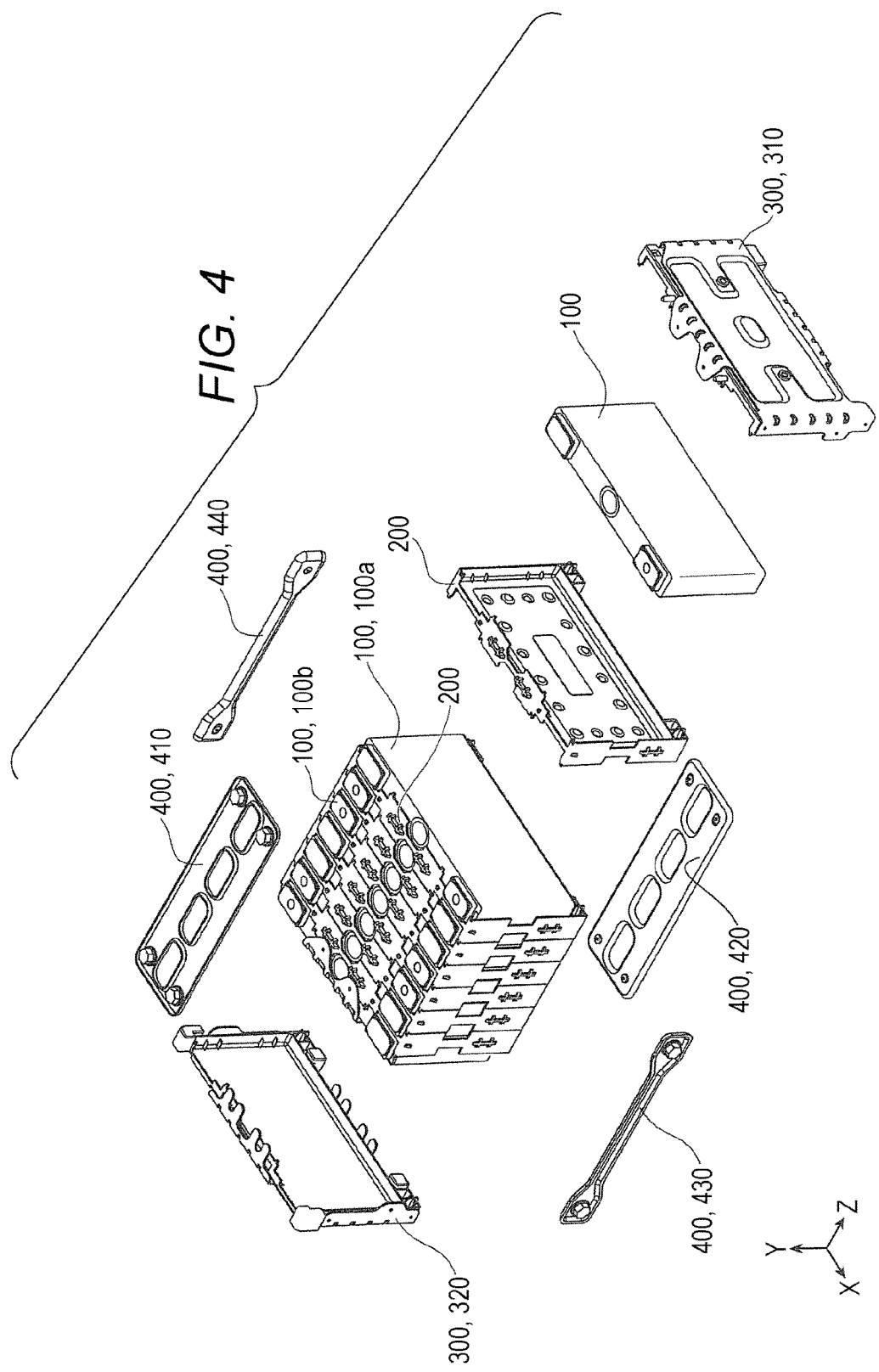
FIG. 4 is a perspective view showing the configuration of the energy storage unit.

FIG. 3 and FIG. 4 are perspective views showing the configuration of the energy storage unit 30. To be more specific, FIG. 3 is an exploded perspective view showing the configuration where a bus bar frame 500 and bus bars 600 are separated from the energy storage unit 30. FIG. 4 is an exploded perspective view showing respective elements remaining after separating the bus bar frame 500 and the bus bars 600 from the energy storage unit 30.

In FIG. 3 and FIG. 4 and the following drawings, for the sake of convenience of the description, the Y axis direction is indicated as the vertical direction, and the description is made using the Y axis direction as the vertical direction in several parts of this specification. However, in an actual mode of use, the Y axis direction is not limited to the vertical direction.

As shown in these figures, the energy storage unit 30 includes: a plurality of energy storage devices 100 (eight energy storage devices 100 in this embodiment); a plurality of spacers 200 (seven spacers 200 in this embodiment); a pair of sandwiching members 300; a plurality of binding members 400 (four binding members 410 to 440 in this embodiment); the bus bar frame 500; and the plurality of bus bars 600.

The energy storage device 100 is a secondary battery (electric cell) which can be charged with electricity or can discharge electricity therefrom. To be more specific, the energy storage device 100 is a nonaqueous electrolyte secondary battery such as a lithium ion secondary battery. The energy storage device 100 has a flat rectangular shape, and is arranged adjacently to the spacer 200. That is, the plurality of respective energy storage devices 100 and the plurality of respective spacers 200 are arranged alternately to each other in the Z axis direction. That is, the spacer 200 is disposed on a side of the energy storage device 100.

In this embodiment, the energy storage devices 100 are arranged in the outer covering 10 in a laterally laid state (see FIG. 2). However, for the sake of convenience of the description, in FIG. 3 and FIG. 4, the energy storage devices 100 are shown in a state where electrode terminals are directed upward. The energy storage device 100 is not limited to a nonaqueous electrolyte secondary battery, and may be a secondary battery other than a nonaqueous electrolyte secondary battery or may be a capacitor. The detailed configuration of the energy storage device 100 is described later.

The spacer 200 is a plate-like member having insulating property which is arranged between every two energy storage devices 100 arranged adjacently to each other, and is formed using a resin or the like which insulates the two energy storage devices 100 from each other. In this embodiment, seven spacers 200 are arranged between eight energy storage devices 100. Although the spacer 200 is formed using an insulating resin such as polycarbonate or polypropylene (PP), for example, the spacer 200 may be formed using any material provided that the material has insulating property.

The spacer 200 is formed such that the spacer 200 covers an approximately half of a front surface side or a back surface side of the energy storage device 100 (an approximately half when the energy storage device 100 is divided in two in the Z axis direction). That is, a recessed portion is formed on both surfaces (both surfaces in the Z axis direction) on a front surface side and a back surface side of the spacer 200, and approximately halves of the energy storage device 100 are inserted in the recessed portions. With such a configuration, every two spacers 200 which sandwich the energy storage device 100 cover the most portion of the energy storage device 100 and hence, insulating property between the energy storage device 100 and another conductive member can be enhanced by the spacer 200. The detailed configuration of the spacer 200 is described later.

The sandwiching members 300 are formed of sandwiching members 310 and 320 which are a pair of flat plate-like members. The sandwiching members 300 hold the plurality of energy storage devices 100 by sandwiching the energy storage devices 100 from both sides in the arrangement direction (in the Z axis direction) of the plurality of energy storage devices 100.

That is, the sandwiching member 310 is a flat plate-like member disposed on the plus side in the Z axis direction relative to the outermost energy storage device 100 on the plus side in the Z axis direction out of the plurality of energy storage devices 100. The sandwiching member 320 is a flat plate-like member disposed on the minus side in the Z axis direction relative to the outermost energy storage device 100 on the minus side in the Z axis direction out of the plurality of energy storage devices 100. The sandwiching member 310 and the sandwiching member 320 hold the plurality of energy storage devices 100 and the plurality of spacers 200 by sandwiching the energy storage devices 100 and the spacers 200 from both sides in the arrangement direction (Z axis direction) of the plurality of energy storage devices 100 and the plurality of spacers 200.

In view of strength or the like, the sandwiching member 300 (sandwiching members 310, 320) is formed of members made of (conductive) metal such as stainless steel or aluminum, for example. However, the insulating property between the sandwiching member 300 and the energy storage device 100 arranged adjacently to the sandwiching member 300 is ensured by arranging an insulating member between the sandwiching member 300 and the energy storage device 100. A member for forming the sandwiching member 300 is not limited to members made of (conductive) metal, and the sandwiching member 300 may be formed of members having high strength and an insulating property, for example. The sandwiching member 310 and the sandwiching member 320 may be formed using the same material, or may be formed using different materials.

The binding members 400 are members each of which has both ends mounted on the sandwiching members 300 so as to bind the plurality of energy storage devices 100 together. That is, the binding members 400 are arranged over the plurality of energy storage devices 100 thus applying a binding force to the plurality of energy storage devices 100 in the arrangement direction (Z axis direction) of the plurality of energy storage devices. Similarly to the sandwiching member 300, the binding members 400 are preferably formed of members made of metal such as stainless steel or aluminum, for example. However, the binding members 400 may be formed of members made of a material other than metal.

To be more specific, one end of the binding member 400 is mounted on the sandwiching member 310, and the other end of the binding member 400 is mounted on the sandwiching member 320. The binding members 400 apply a binding force to the plurality of energy storage devices 100 and the plurality of spacers 200 in the direction that the plurality of energy storage devices 100 and the plurality of spacers 200 are arranged.

In this embodiment, the binding members 400 are formed of binding members 410 to 440. The binding members 410 and 420 are arranged on both sides of the plurality of energy storage devices 100 in the vertical direction (both sides in the Y axis direction), and bind the plurality of energy storage devices 100 together by sandwiching the plurality of energy storage devices 100 from both sides. Further, the binding members 430 and 440 are arranged on both sides of the plurality of energy storage devices 100 (both sides in the X axis direction), and bind the plurality of energy storage devices 100 together from both sides.

To be more specific, the binding member 410 and the binding member 420 are a pair of flat plate-like elongated member which is arranged on the plus side and the minus side of the plurality of energy storage devices 100 in the Y axis direction. The binding member 430 and the binding member 440 are a pair of flat plate-like elongated member which is arranged on the plus side and the minus side of the plurality of energy storage devices 100 in the X axis direction.

The bus bar frame 500 is a member which can apply insulating property between the bus bars 600 and other members, can protect various lines or the like arranged in the energy storage apparatus 1, and can restrict positions of the bus bars 600. In particular, the bus bar frame 500 performs the positioning of the bus bars 600 with respect to the plurality of energy storage devices 100.

To be more specific, the bus bar frame 500 is placed above the plurality of energy storage devices 100 (on the plus side in the Y axis direction), and is positioned with respect to the plurality of energy storage devices 100. The bus bars 600 are placed on the bus bar frame 500. In placing the bus bars 600 on the bus bar frame 500, protrusions which the bus bar frame 500 has are inserted into opening portions formed in the bus bars 600 so that the bus bars 600 are positioned with respect to the bus bar frame 500. With such a configuration, the bus bars 600 are positioned with respect to the plurality of energy storage devices 100, and the bus bars 600 are joined to electrode terminals which the plurality of respective energy storage devices 100 include.

The bus bar frame 500 is formed using an insulating resin such as polycarbonate or polypropylene (PP), for example. However, provided that the bus bar frame 500 is formed using a material having insulating property, the bus bar frame 500 may be formed using any material. The detailed configuration of the bus bar frame 500 and the detailed configuration where the bus bar frame 500 positions the bus bars 600 are described later.

The bus bar 600 is a bus bar electrically connected to the plurality of respective energy storage devices 100. That is, the bus bar 600 is a conductive member electrically connected to the electrode terminals which the plurality of respective energy storage devices 100 include, and electrically connects the electrode terminals which the plurality of respective energy storage devices 100 include to each other.

The bus bar 600 is formed of a conductive member made of aluminum, for example. However, a material for forming the bus bar 600 is not particularly limited. All bus bars 600 may be formed using the same material, or some bus bars may be formed using a material different from a material for forming remaining bus bars.

Next, the configuration of the energy storage device 100 is described in detail.

FIG. 5 is a perspective view showing the configuration of the energy storage device 100. To be more specific, FIG. 5 is a perspective view showing the inside of the energy storage device 100 by showing a container 110 of the energy storage device 100 in a see-through manner.

As shown in FIG. 5, the energy storage device 100 includes: the container 110; a positive electrode terminal 120; and a negative electrode terminal 130. An electrode assembly 140, a positive current collector 150 and a negative current collector 160 are arranged in the container 110. A liquid such as an electrolyte solution is sealed in the container 110. However, the illustration of the liquid is omitted.

The container 110 is constituted of: a bottomed body made of metal and having a rectangular cylindrical shape; and a metal-made lid portion which closes an opening of the body. The electrode assembly 140 and the like are accommodated in the inside thereof and, thereafter, the lid portion and the body are joined to each other by welding or the like, such that the container 110 can hermetically seal the inside thereof.

The electrode assembly 140 is a power generating element which includes a positive electrode, a negative electrode and a separator, and can store electricity. To be more specific, the electrode assembly 140 is a winding-type electrode assembly formed by winding a layered body where the separator is sandwiched between the positive electrode and the negative electrode. The electrode assembly 140 may be a stacked-type electrode assembly formed by stacking plate-shaped electrode plates.

The positive electrode is an electrode plate where a positive electrode active substance layer is formed on a surface of an elongated strip-shaped conductive positive current collector foil made of aluminum, an aluminum alloy or the like. The negative electrode is an electrode plate where a negative electrode active substance layer is formed on a surface of an elongated strip-shaped conductive negative current collector foil made of copper, a copper alloy or the like. The separator is a sheet having minute pores. The positive electrode, the negative electrode and the separator which are used in the energy storage device 100 are not particularly different from positive electrodes, negative electrodes and separators used conventionally. Known materials can be used as desired provided that the performance of the energy storage device 100 is not impaired. The kind of electrolyte solution (nonaqueous electrolyte) sealed in the container 110 is also not particularly limited provided that the performance of the energy storage device 100 is not impaired, and various electrolyte solutions can be selected.

The positive electrode terminal 120 is an electrode terminal which is electrically connected to a positive electrode of the electrode assembly 140 by way of the positive current collector 150, and the negative electrode terminal 130 is an electrode terminal which is electrically connected to a negative electrode of the electrode assembly 140 by way of the negative current collector 160. That is, the positive electrode terminal 120 and the negative electrode terminal 130 are metal-made electrode terminals for leading out electricity stored in the electrode assembly 140 to an external space of the energy storage device 100 and leading electricity into an inner space of the energy storage device 100 for storing electricity in the electrode assembly 140.

The positive current collector 150 is a member having conductivity and rigidity which is arranged between the positive electrode of the electrode assembly 140 and a side wall of the container 110, and is electrically connected to the positive electrode terminal 120 and the positive electrode. Similarly to the positive current collector foil used in the positive electrode, the positive current collector 150 is formed using aluminum, an aluminum alloy or the like. The negative current collector 160 is a member having conductivity and rigidity which is arranged between the negative electrode of the electrode assembly 140 and the side wall of the container 110, and is electrically connected to the negative electrode terminal 130 and the negative electrode of the electrode assembly 140. Similarly to the negative current collector foil used in the negative electrode, the negative current collector 160 is formed using copper, a copper alloy or the like.

Next, the configuration of the electric equipment 40 is described in detail.

Figure 6:
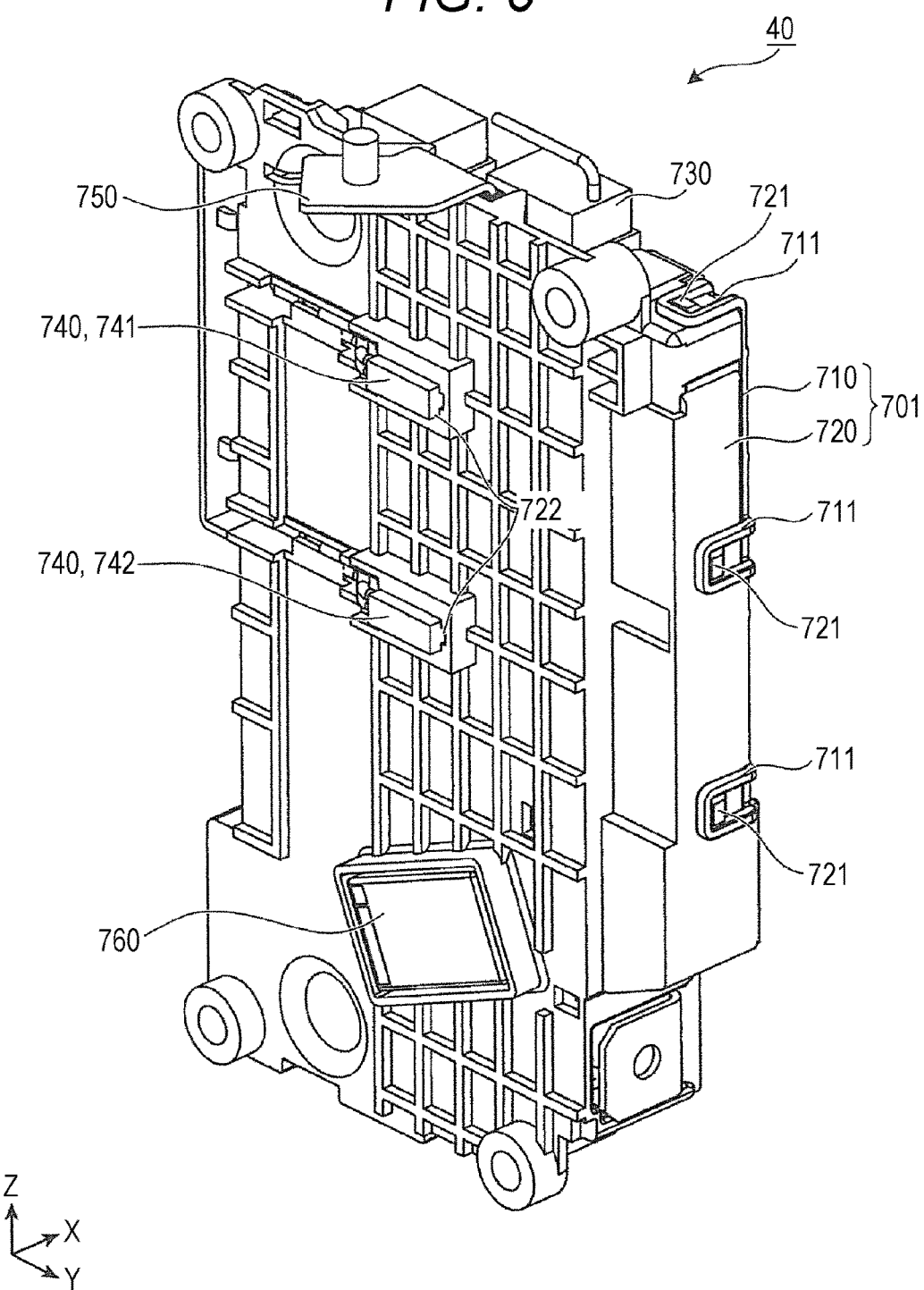
FIG. 6 is a perspective view showing a configuration of electric equipment.
Figure 7:
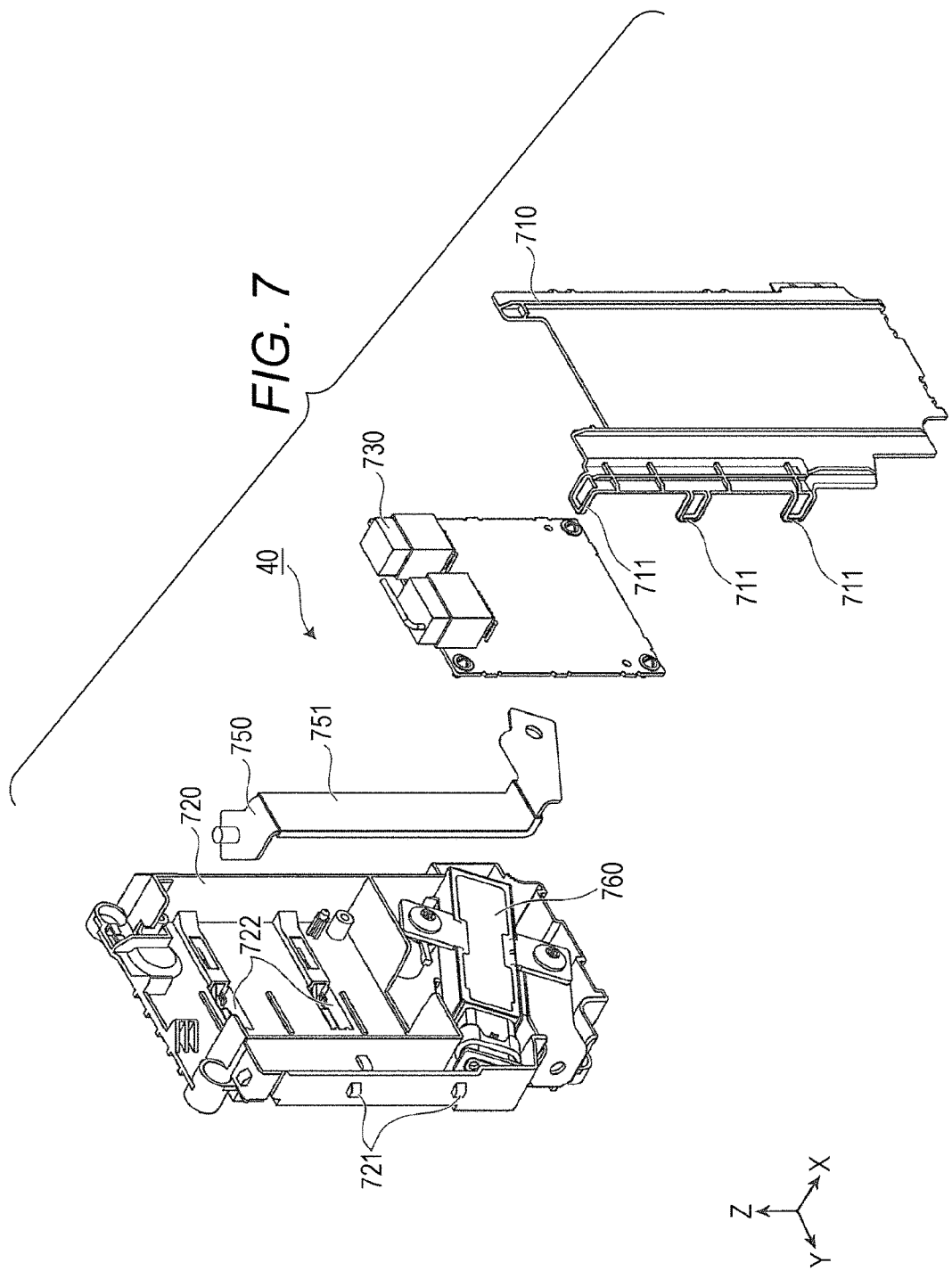
FIG. 7 is an exploded perspective view showing respective elements of the electric equipment in an exploded manner.
Figure 8:
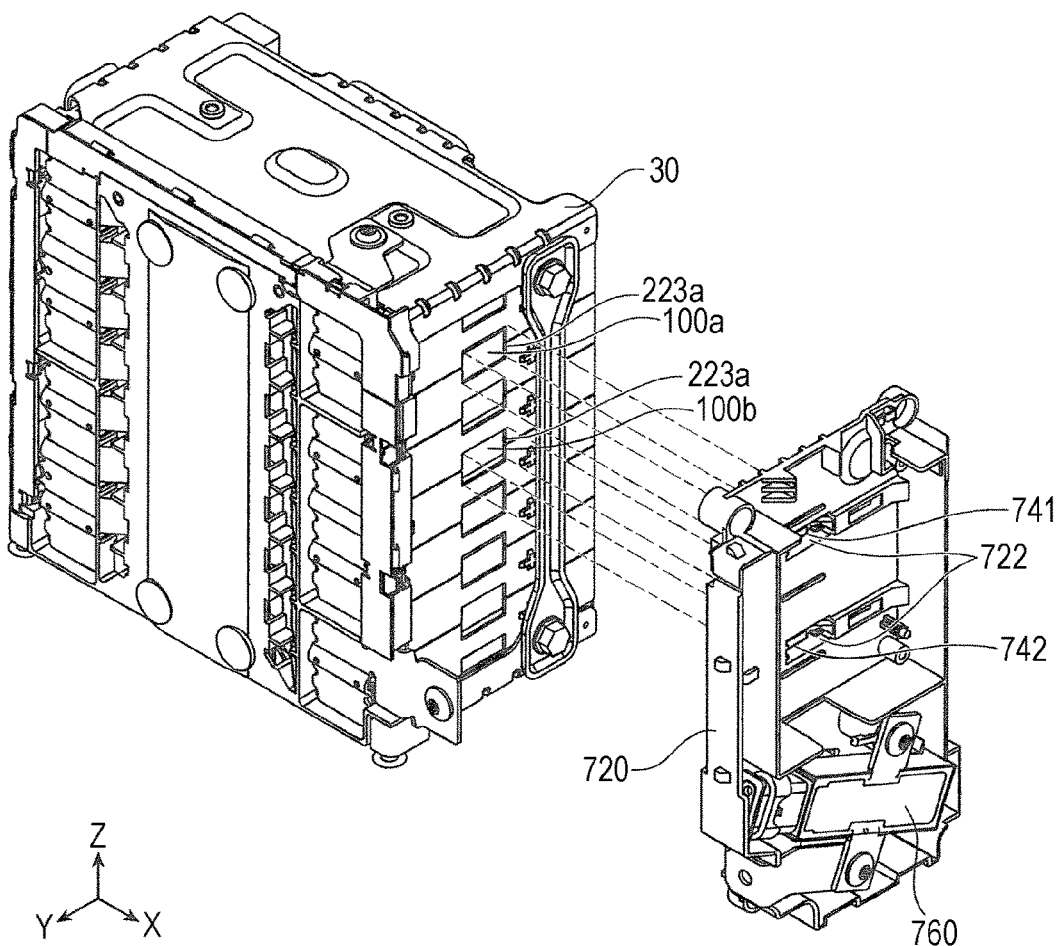
FIG. 8 is a perspective view showing a positional relationship between the energy storage unit and a portion of the electric equipment.

FIG. 6 is a perspective view showing a configuration of the electric equipment 40. FIG. 7 is an exploded perspective view showing respective elements of the electric equipment 40 in an exploded manner. FIG. 8 is a perspective view showing a positional relationship between the energy storage unit 30 and a portion of the electric equipment 40.

As shown in FIG. 6 and FIG. 7, the electric equipment 40 is configured such that various parts such as a printed circuit board 730, measuring parts 740, a positive electrode bus bar 750 and a relay 760 are accommodated in a box-shaped electric equipment container 701.

The electric equipment container 701 is a box-shaped member formed using an insulating resin such as polycarbonate or polypropylene (PP), for example, and is formed of a lid portion 710 and a container body 720. The lid portion 710 has a plurality of engaging portions 711 for joining the lid portion 710 to the container body 720 on an outer peripheral portion thereof (to be more specific, both ends in the Y axis direction and both ends in the Z axis direction). The container body 720 is a bottomed rectangular cylindrical member which can accommodate various parts therein, and has a plurality of projecting portions to be engaged 721 which are engaged with the plurality of engaging portions 711 on side walls (to be more specific, side walls formed at both ends in the Y axis direction and side walls formed at both ends in the Z axis direction) thereof. The electric equipment container 701 is formed into a box-shaped member which accommodates various parts therein by making the plurality of engaging portions 711 of the lid portion 710 engage with the plurality of portions to be engaged 721 of the container body 720.

The printed circuit board 730 is connected to the positive electrode terminals 120 or the negative electrode terminals 130 of the energy storage devices 100 disposed in the energy storage unit 30, measuring parts 740 and the like through lines (lead lines). For example, the printed circuit board 730 controls a charge state, a discharge state (a battery state such as a voltage or a temperature) and the like of the energy storage devices 100 by acquiring and monitoring the charge state, the discharge state and the like of the energy storage devices 100.

The measuring parts 740 are temperature sensors (thermistors) which measure temperatures of two energy storage devices 100 in the energy storage unit 30. The measuring parts 740 are arranged in opening portions 722 each formed in a bottom surface of the container body 720 on the minus side in the X axis direction. That is, the measuring parts 740 are each disposed on the plus side of the energy storage device 100 in the X axis direction. To be more specific, as shown in FIG. 8, the measuring parts 740 are formed of; a measuring part 741 which measures a temperature of a second energy storage device 100a as counted from the energy storage device 100 at the end on the plus side in the Z axis direction in the energy storage unit 30; and a measuring part 742 which measures a temperature of a fourth energy storage device 100b as counted from the energy storage device 100 at the end on the plus side in the Z axis direction in the energy storage unit 30 (see also FIG. 3 and FIG. 4). The measuring part 741 is arranged so as to be brought into surface contact with a side surface of the energy storage device 100a on a negative electrode side, and the measuring part 742 is arranged so as to be brought into surface contact with a side surface of the energy storage device 100b on a positive electrode side. To be more specific, the measuring parts 740 are arranged so as to be brought into surface contact with the side surfaces of the energy storage devices 100, the side surfaces on the plus side in the X axis direction and exposed through the opening portions 223a formed in the spacers 200 that cover the energy storage devices 100. In this manner, the measuring parts 740 are brought into contact with the side surfaces of the energy storage devices 100 on the plus side in the X axis direction and hence, the measuring parts 740 are brought into contact with the side surfaces of the energy storage devices 100 at positions where the measuring parts 740 face the positive current collector 150 of the energy storage device 100 and the negative current collector 160 of the energy storage device 100 in an opposed manner. It is preferable that, out of the side surfaces of the energy storage devices 100 which face the positive current collector 150 and the negative current collector 160 in an opposed manner, the measuring parts 740 be brought into contact with the side surfaces of the energy storage devices 100 at positions close to the electrode terminals 120, 130. The reason is that, in the energy storage devices 100, the positive current collectors 150 and the negative current collectors 160 easily generate heat, and heat is easily generated at positions close to the electrode terminals 120, 130.

In this manner, the measuring part 740 measures a temperature of the energy storage device 100b arranged in the vicinity of the center in the arrangement direction (Z axis direction) of the plurality of energy storage devices 100 in the energy storage unit 30 and hence, it is possible to measure a temperature of the energy storage device 100b which tends to increase its temperature more out of the plurality of energy storage devices 100. The measuring part 742 is arranged on the side surface of the energy storage device 100b on the positive electrode side (that is, a position where the measuring part 742 faces the positive current collector 150) where heat tends to be generated more easily than on the negative electrode side and hence, it is possible to measure a temperature of a portion of the energy storage device 100b which tends to increase its temperature easily. The reason the positive current collector 150 tends to increase its temperature more easily than the negative current collector 160 is that aluminum (aluminum alloy) which is used for forming the positive current collector 150 has a larger resistance than copper (copper alloy) which is used for forming the negative current collector 160. That is, the measuring part 742 measures a temperature of a portion of the energy storage unit 30 which tends to increase its temperature the most. Accordingly, the temperature measured by the measuring part 742 can be effectively used in control of various parts performed by the printed circuit board 730.

The positive electrode bus bar 750 is a bus bar which is electrically connected to a positive electrode terminal of the energy storage unit 30 formed by electrically connecting the plurality of energy storage devices 100 by the bus bars 600, and the relay 760. The positive electrode bus bar 750 is covered by an insulating member 751 formed of a heat-shrinkable tube except for portions thereof which are connected to the positive electrode terminal of the energy storage unit 30 and the relay 760.

The relay 760 is electrically connected to the positive electrode bus bar 750 and the positive external terminal 21. The relay 760 is a relay switch which changes over a conduction between the positive electrode terminal of the energy storage unit 30 and the positive external terminal 21 between a conductive state and a non-conductive state in response to a control signal from the printed circuit board 730.

Next, a configuration of the spacer 200 is described in detail.

Figure 10:
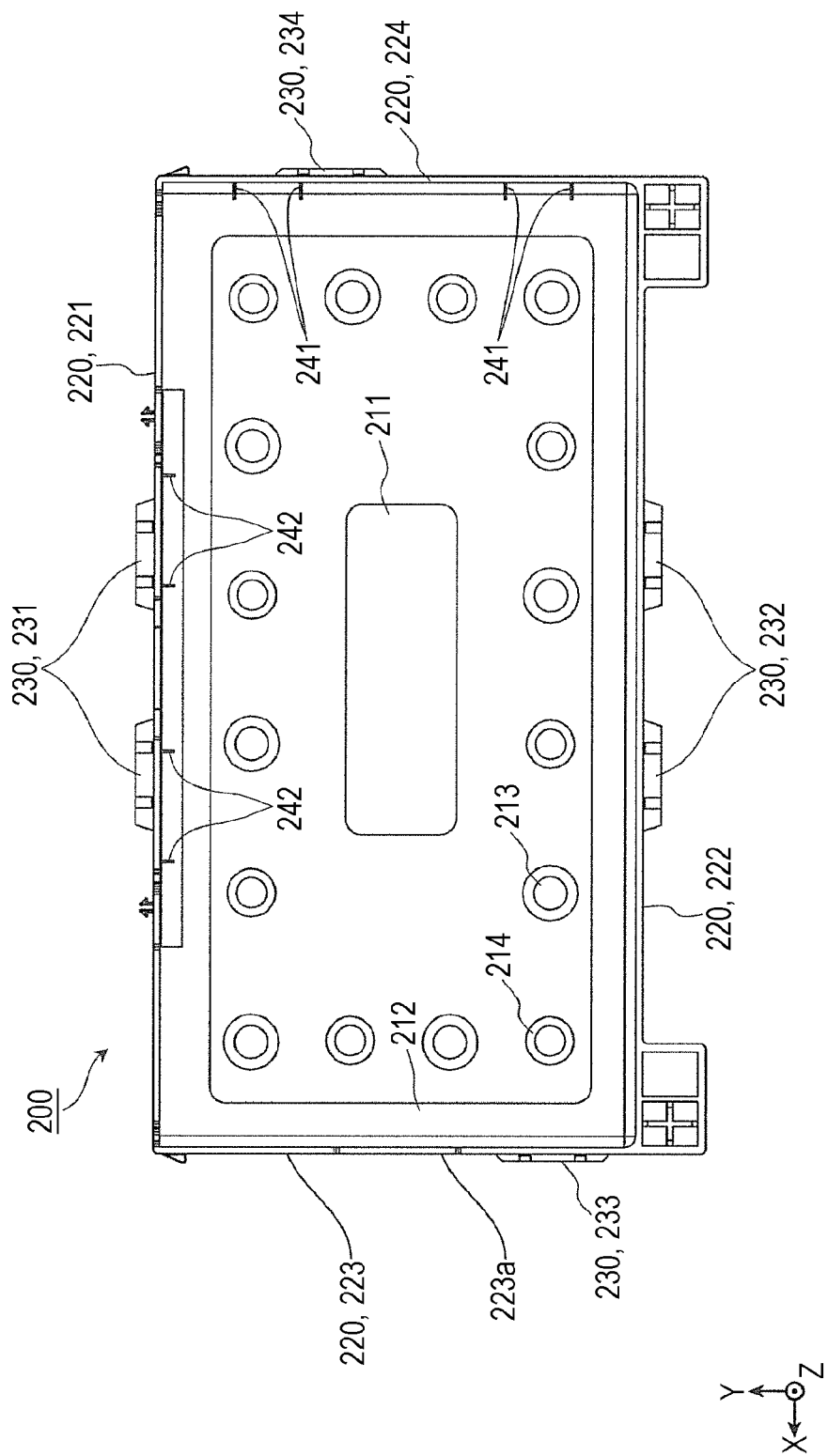
FIG. 10 is a plan view showing a configuration of the spacer.

FIG. 9A and FIG. 9B are perspective views showing a configuration of the spacer 200. FIG. 10 is a plan view showing a configuration of the spacer 200.

As shown in these figures, the spacer 200 includes: a plate-like member 210 arranged on a side of the energy storage device 100 in the Z axis direction; and a wall portion 220 arranged on both sides of the energy storage device 100 in the X axis direction as well as on both sides of the energy storage device 100 in the Y axis direction.

The spacer 200 includes: a pressing projecting portion 211; annular projecting portions 212; and hollow projecting portions 213, 214 all of which project to both sides in the Z axis direction from the plate-like member 210. The plate-like member 210 is a plate-like member which is formed along an X-Y plane, and has a rectangular shape elongated in the X axis direction. The pressing projecting portion 211, the annular projecting portions 212 and the plurality of hollow projecting portions 213, 214 are projecting portions which are brought into contact with the energy storage devices 100 in a state where a binding force is applied between the energy storage device 100 and the spacer 200 by the binding members 400.

The pressing projecting portion 211 is brought into contact with the energy storage devices 100 thus pressing the energy storage devices 100. The pressing projecting portion 211 is formed at a portion of the plate-like member 210 in the vicinity of the center of the plate-like member 210, and projects in the form of a rectangular shape elongated in the X axis direction as viewed in the Z axis direction. That is, the pressing projecting portion 211 is disposed at a position which faces the center of the side surface of the energy storage device 100 in an opposed manner.

The annular projecting portions 212 annularly project toward the energy storage devices 100, and are brought into contact with the energy storage devices 100 so as to hermetically seal annular inner spaces. The annular projecting portions 212 project toward both sides in the Z axis direction from an outer peripheral portion of the plate-like member 210. That is, the spacer 200 includes two annular projecting portions 212 which project toward two energy storage devices 100 disposed on both sides of the plate-like member 210. The annular projecting portion 212 is formed so as to surround the pressing projecting portion 211 along an inner side of the wall portion 220. That is, the pressing projecting portion 211 is formed in an inner space defined by the annular projecting portion 212. The annular projecting portions 212 are formed along outer peripheral portions of the side surfaces of the energy storage devices 100.

The plurality of hollow projecting portions 213, 214 project toward the energy storage devices 100 such that a space is formed in the respective hollow projecting portions 213, 214. Each of the plurality of hollow projecting portions 213, 214 has a shape where a part of the hollow projecting portion on a side opposite to a projecting part of the hollow projecting portion is indented in conformity with a shape of the projecting part. That is, a space is formed in each of the plurality of hollow projecting portions 213, 214 by indenting the part of the hollow projecting portion on the side opposite to the projecting part. Each of the plurality of hollow projecting portions 213, 214 has a tapered shape where a distance (diameter) of the hollow projecting portion in the direction perpendicular to the projecting direction is decreased toward a distal end thereof. That is, each of the plurality of hollow projecting portions 213, 214 projects in the form of an approximately circular truncated cone shape.

The plurality of hollow projecting portions 213, 214 are formed of the plurality of first hollow projecting portions 213 which project from the plate-like member 210 on the plus side in the Z axis direction and the plurality of second hollow projecting portions 214 which project from the plate-like member 210 on the minus side in the Z axis direction. That is, the first hollow projecting portions 213 project toward one energy storage device 100 out of two energy storage devices 100 disposed on both sides of the spacer 200. The second hollow projecting portions 214 project to the other energy storage device 100 out of two energy storage devices 100. The first hollow projecting portions 213 and the second hollow projecting portions 214 differ from each other only in the projecting direction, that is, the first hollow projecting portions 213 and the second hollow projecting portions 214 project to opposite sides. The first hollow projecting portions 213 and the second hollow projecting portions 214 have the same projecting shape and the indented shape. The plurality of hollow projecting portions 213, 214 are annularly disposed in the inner space of the annular projecting portion 212 so as to surround the pressing projecting portion 211. The plurality of respective first hollow projecting portions 213 and the plurality of respective second hollow projecting portions 214 are arranged alternately to each other. The wall portion 220 extends to both sides in the Z axis direction from an outer edge of the plate-like member 210, and is formed so as to surround four sides of the energy storage device 100. That is, a recessed portion of the spacer 200 which covers an approximately half of a front surface side or a back surface side of the energy storage device 100 is formed of the plate-like member 210 and the wall portion 220. The wall portion 220 is formed of a wall portion 221 disposed on the plus side of the energy storage device 100 in the Y axis direction; a wall portion 222 disposed on the minus side of the energy storage device 100 in the Y axis direction; a wall portion 223 disposed on the plus side of the energy storage device 100 in the X axis direction; and a wall portion 224 disposed on the minus side of the energy storage device 100 in the X axis direction. The opening portion 223a is formed in the wall portion 223 at a position where the measuring part 740 is disposed. That is, the opening portion 223a for exposing the side surface of the energy storage device 100 is formed in the wall portion 223 so as to allow the measuring part 740 to be directly brought into contact with the side surface of the energy storage device 100. As described above, the energy storage device 100 is arranged between two spacers 200, and the side surface of the energy storage device 100 on the plus side in the X axis direction on which the measuring part 740 is mounted is covered by the wall portions 223 of two spacers 200 from both sides in the Z axis direction. Accordingly, by forming the opening portions 223a in the wall portions 223 of the spacers 200 on both sides of the wall portion 223 in the Z axis direction by cutting, and by combining the spacers 200 arranged adjacently to each other, a rectangular opening can be formed in the wall portions 223 corresponding to the side surface of the energy storage device 100 on the plus side in the X axis direction. That is, it is possible to expose the side surface of the energy storage device 100 on the plus side in the X axis direction in a region disposed at the center in the Z axis direction.

Cruciform projecting portions 230 are formed on the wall portion 220 such that each of the cruciform projecting portions 230 projects outward from the wall portion 220 in the form of a cruciform shape. To be more specific, cruciform projecting portions 231 which project from the wall portion 221 on the plus side in the Y axis direction are formed on the wall portion 221, cruciform projecting portions 232 which project from the wall portion 222 on the minus side in the Y axis direction are formed on the wall portion 222, a cruciform projecting portion 233 which projects from the wall portion 223 on the plus side in the X axis direction is formed on the wall portion 223, and a cruciform projecting portion 234 which projects from the wall portion 224 on the minus side in the X axis direction is formed on the wall portion 224. In this manner, the cruciform projecting portions 230 are formed on the wall portion 220 and hence, a gap formed between the spacers 200 and the binding members 400 can be filled by the cruciform projecting portions 230 in a state where the energy storage devices 100 and the spacers 200 are bound by the binding members 400.

The spacers 200 have a plurality of protrusions 241, 242 arranged at positions where the protrusions 241, 242 are brought into contact with surfaces of the energy storage device 100 which intersects with the surface of the energy storage device 100 with which the respective projecting portions 211 to 214 are brought into contact. In this embodiment, the spacer 200 includes: four protrusions 241 which are formed on an edge portion of the plate-like member 210 on the minus side in the X axis direction and on the wall portion 224; and four protrusions 242 which are formed on an edge portion of the plate-like member 210 on the plus side in the Y axis direction and on the wall portion 221.

The spacer 200 is formed as an integral body. That is, the plate-like member 210, the wall portion 220, the respective projecting portions 211, 212, 213, 214, 230 and the plurality of protrusions 241, 242 which the spacer 200 includes are formed by integral molding using the above-mentioned material (resin).

Next, a biasing force generated by the plurality of protrusions 241 for biasing the energy storage devices 100 to the measuring parts 740 is described with reference to FIG. 11.

Figure 11:
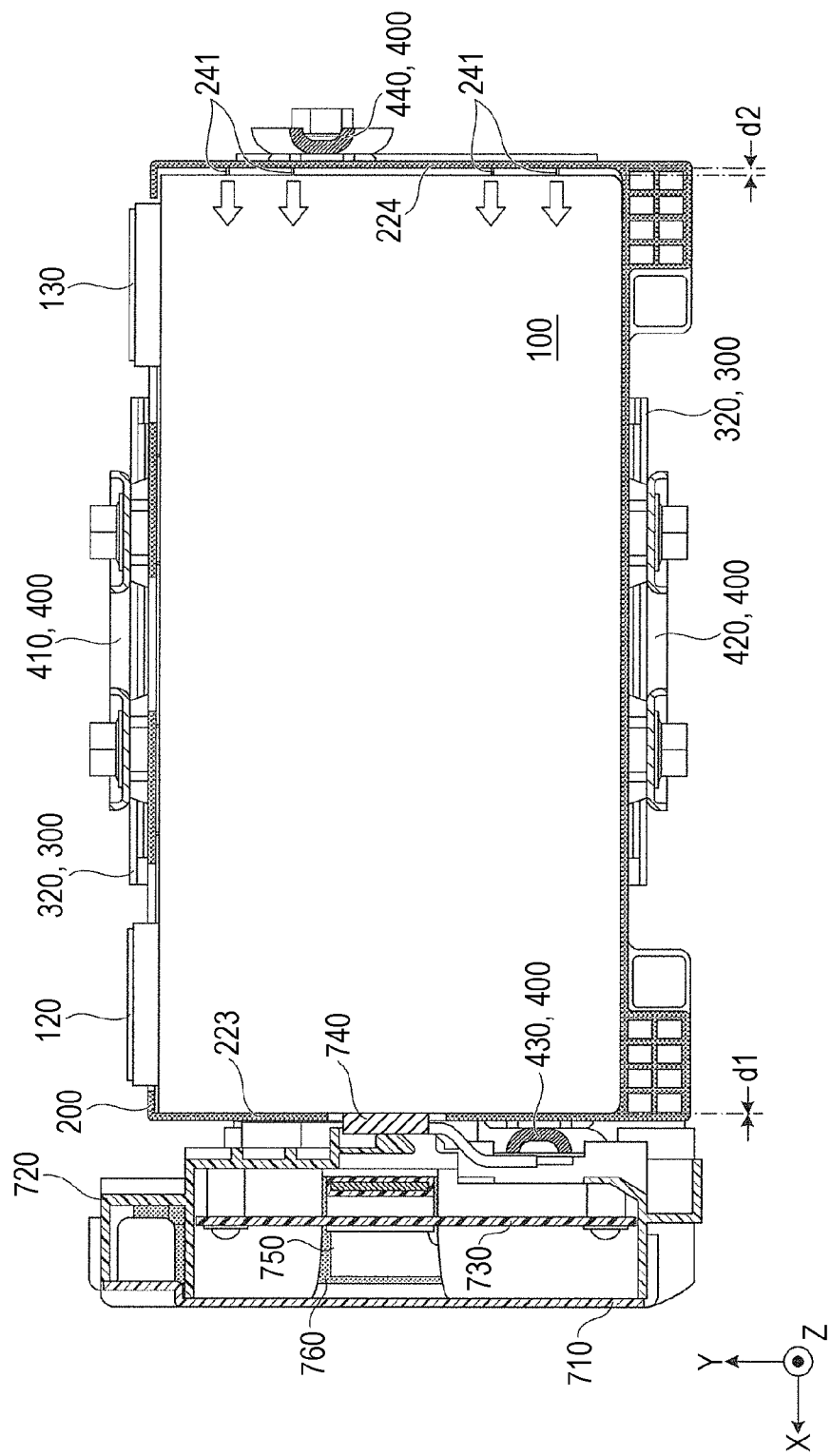
FIG. 11 is a cross-sectional view of an assembled body of the energy storage unit and the electric equipment taken along an X-Y plane which passes a measuring part.

FIG. 11 is a cross-sectional view of an assembled body of the energy storage unit 30 and the electric equipment 40 taken along an X-Y plane which passes the measuring part 740.

As shown in FIG. 11, when the energy storage device 100 is arranged at a predetermined position on one side of the spacer 200, the plurality of protrusions 241 are brought into contact with a surface of the energy storage device 100 on the minus side in the X axis direction thus biasing the energy storage device 100 toward the plus side in the X axis direction. That is, the plurality of protrusions 241 are configured to apply a biasing force directed toward the measuring part 740 side to the energy storage device 100. The energy storage device 100 is biased toward the plus side in the X axis direction by the plurality of protrusions 241, and no protrusion is formed on the wall portion 223 of the spacer 200 on the plus side in the X axis direction and hence, the side surface of the energy storage device 100 on the plus side in the X axis direction is brought into contact with the wall portion 223. With such a configuration, when the energy storage device 100 is arranged on the side of the spacer 200 at the predetermined position, a distance d1 between the wall portion 223 of the spacer 200 on the plus side in the X axis direction and the energy storage device 100 is smaller than a distance d2 between the wall portion 224 of the spacer 200 on the minus side in the X axis direction and the energy storage device 100. In this manner, the positioning of the energy storage device 100 with respect to the spacer 200 in the X axis direction is performed by the plurality of protrusions 241 and the wall portion 223.

When the energy storage device 100 is arranged at the predetermined position on the side of the spacer 200, the plurality of protrusions 242 are brought into contact with a surface of the energy storage device 100 on the plus side in the Y axis direction thus biasing the energy storage device 100 to the minus side in the Y axis direction. The energy storage device 100 is biased toward the minus side in the Y axis direction by the plurality of protrusions 242 and hence, the side surface of the energy storage device 100 on the minus side in the Y axis direction is brought into contact with the wall portion 222. That is, the positioning of the energy storage device 100 with respect to the spacer 200 in the Y axis direction is performed by the plurality of protrusions 242 and the wall portion 222.

In this manner, the spacer 200 is configured to include the plurality of protrusions 241, 242, the wall portion 222 and the wall portion 223 and hence, the positional relationship between the energy storage device 100 and the spacer 200 in the X axis direction and the Y axis direction can be easily established.

In the spacer 200 before the spacer 200 is assembled with the energy storage device 100, a distance between distal ends of the plurality of protrusions 241 on the plus side in the X axis direction and the wall portion 223 is slightly smaller than a width of the energy storage device 100 in the X axis direction. A distance between distal ends of the plurality of protrusions 242 on the minus side in the Y axis direction and the wall portion 223 is slightly smaller than a width of the energy storage device 100 in the Y axis direction. Accordingly, when the energy storage device 100 is assembled with the spacer 200, the distal ends of the plurality of protrusions 241 on the plus side in the X axis direction are brought into contact with the side surface of the energy storage device 100 on the minus side in the X axis direction and the distal ends of the plurality of protrusions 242 on the minus side in the Y axis direction are brought into contact with the side surface of the energy storage device 100 on the plus side in the Y axis direction and are deformed. With such a configuration, a biasing force directed toward the plus side in the X axis direction as well as a biasing force directed toward the minus side in the Y axis direction can be applied to the energy storage device 100.

The measuring parts 740 are biased toward the minus side in the X axis direction by biasing portions 723 formed on the container body 720 of the electric equipment container 701. That is, the measuring parts 740 are biased by the biasing portion 723 of the container body 720 and the energy storage device 100 is biased by the plurality of protrusions 241 of the spacer 200 such that the measuring part 740 and the energy storage device 100 are made close to each other.

Next, the arrangement positions of the binding members 430, 440 are described with reference to FIG. 11.

As shown in FIG. 11, two binding members 430, 440 are arranged on both ends of the assembled body of the energy storage devices 100 and the spacers 200 in the X axis direction at positions different from each other in the Y axis direction. To be more specific, the binding member 430 forming a first binding member which is one of the two binding members 430, 440 is arranged on the minus side in the Y axis direction relative to the measuring part 740. The binding member 440 forming a second binding member which is the other of the two binding members 430, 440 is arranged on the minus side of the binding member 430 in the X axis direction as well as on the plus side of the binding member 430 in the Y axis direction. The two binding members 430, 440 are arranged approximately in point symmetry with respect to the center of the energy storage device 100. That is, the two binding members 430, 440 are arranged at staggered positions so as not to face each other in an opposed manner in the X axis direction.

As described above, according to the energy storage apparatus 1 of the embodiment of the present invention, the energy storage device 100 is arranged at a position on a side where the energy storage device 100 is more close to the wall portion 223 of the spacer 200 on the plus side in the X-axis direction where the measuring part 740 is disposed than close to the wall portion 224 of the spacer 200 on the minus side in the X-axis direction. Accordingly, it is possible to surely bring the energy storage device 100 into a state where the energy storage device 100 is disposed close to the measuring part 740. With such a configuration, the measuring part 740 can measure a state of the energy storage device 100 with high accuracy.

The protrusions 241 are configured to apply a biasing force directed toward a measuring part 740 side to the energy storage device 100. Accordingly, even when vibrations or an impact is applied to energy storage apparatus, the spacer 200 can maintain a state where the energy storage device 100 is disposed close to the measuring part 740.

The spacer 200 includes the protrusions 241 for making the energy storage device 100 close to the measuring part 740, the protrusions 241 being arranged at a position where the protrusions 241 are brought into contact with a surface of the energy storage device 100 on a side opposite to a surface of the energy storage device 100 on the plus side in the X axis direction. That is, the spacer 200 is disposed on a side of the energy storage device 100 in the Z axis direction (that is, a side of the energy storage device 100), and the protrusions 241 are formed on the spacer 200 at a position where the protrusions 241 are brought into contact with the surface of the energy storage device 100 on a side opposite to a surface of the energy storage device 100 on which the measuring part 740 is disposed. Hence, the energy storage device 100 can be brought into a state where the energy storage device 100 is disposed close to the measuring part 740 when the energy storage device 100 is arranged on a side of the spacer 200. Accordingly, the measuring part 740 can measure a temperature of the energy storage device 100 with high accuracy.

The opening portion 223a is formed in the wall portion 223 of the spacer 200 disposed on the plus side of the energy storage device 100 in the X axis direction at a position where the measuring part 740 is disposed. Accordingly, a temperature of the energy storage device 100 can be measured by the measuring part 740 easily with high accuracy while enhancing insulating property on the plus side of the energy storage device 100 in the X axis direction.

The plurality of protrusions 241 are formed on the wall portion 224 of the spacer 200 disposed on the minus side of the energy storage device 100 in the X axis direction. Accordingly, the energy storage device 100 can be made close to the measuring part 740 in a state where the energy storage device 100 is not inclined in the X axis direction. That is, the measuring part 740 can measure a temperature of the energy storage device 100 using the surface of the energy storage device 100 in a stable state and hence, the state of the energy storage device 100 can be measured with high accuracy.

The binding member 430 which is one binding member out of the two binding members 430, 440 is arranged on the same side as the measuring part 740. The measuring part 740 is arranged on a side of the assembled body formed of the energy storage devices 100 and the spacers 200, and the binding member 430 is arranged more outside than the measuring part 740 in the Y axis direction. Accordingly, the two binding members 430, 440 can be arranged at positions excluding a position where the measuring part 740 is arranged. Accordingly, in disposing the measuring part 740 on the plus side of the energy storage device 100 in the X axis direction, the measuring part 740 can be arranged without causing the interference between the measuring part 740 and the two binding members 430, 440. Further, the two binding members 430, 440 can uniformly apply a binding force to the energy storage devices 100 and the spacers 200 over the whole widths in the Y axis direction. Accordingly, the measuring part 740 can surely measure a temperature of the energy storage device 100. Further, the two binding members 430, 440 can apply a binding force between the energy storage devices 100 and the spacers 200 in a more stable manner.

As in the case of this embodiment, when two binding members are arranged at positions different from each other in the third direction such that the two binding members sandwich the energy storage devices 100 and the spacers 200 in the second direction, in order to apply a binding force to the energy storage devices 100 and the spacers 200 over the whole region in the second direction, it is preferable that the two binding members are arranged on short sides of the rectangular sandwiching members 300. As in the case of this embodiment, by arranging two binding members on the short sides of the sandwiching members 300 at positions which differ from each other in the direction intersecting with the short sides (that is, staggered positions), it is possible to reduce a possibility of applying a non-uniform binding force to the energy storage devices 100 and the spacers 200 compared to a case where the two binding members are arranged on long sides of the sandwiching members 300 at staggered positions.

Two binding members 430, 440 are arranged approximately in point symmetry with respect to the center of the energy storage device 100. Accordingly, the two binding members 430, 440 can uniformly apply a binding force between the energy storage devices 100 and the spacers 200 over the whole widths of the energy storage devices 100 and the spacers 200 in the Y axis direction. Accordingly, the two binding members 430, 440 can apply a binding force between the energy storage devices 100 and the spacers 200 in a more stable manner.

Although the energy storage apparatus 1 according to the embodiment has been described heretofore, the present invention is not limited to the above-mentioned embodiment. That is, it should be construed that the embodiment disclosed in this specification is only for an exemplifying purpose in all aspects, and the present invention is not limited by the embodiment. The scope of the present invention is not defined by the above-mentioned description but is defined by claims, and it is intended that the present invention includes all changes made within the equivalent meaning and scope called for in claims.

For example, in the above-mentioned embodiment, the plurality of protrusions 241 are formed on the spacer 200 such that the plurality of protrusions 241 are brought into contact with the surface of the energy storage device 100 on a side opposite to the surface of the energy storage device 100 with which the measuring part 740 is brought into contact. However, it is possible to adopt a spacer provided with one protrusion in place of the plurality of protrusions 241. In this case, it is desirable that the protrusion be arranged at a position which corresponds to the measuring part 740 in the X axis direction. In this case, the X axis direction is a direction approximately perpendicular to the side surface of the energy storage device 100 which faces in the X axis direction. That is, it is desirable that the protrusion be arranged at a position included in a position of the measuring part 740 in the Y axis direction. With such a configuration, even when the spacer 200 is provided with one protrusion, a biasing force directed in the X axis direction can be applied to the energy storage device 100 and hence, it is possible to effectively bring the energy storage device 100 close to the measuring part 740. Even with respect to the spacer provided with the plurality of protrusions, it is desirable that a range of the plurality of protrusions in the Y axis direction overlap with positions in the Y axis direction at which the measuring parts 740 are arranged. With such a configuration, the spacer can bring the energy storage device 100 close to the measuring parts 740 at positions corresponding to at least the measuring parts 740.

It is also safe to say that the protrusions and the measuring parts 740 are arranged so as to be directed to each other in the X axis direction with the energy storage device 100 interposed therebetween.

In the above-mentioned embodiment, the plurality of protrusions 241 are formed on the wall portion 224 of the spacer 200 on the minus side in the X axis direction, and a plurality of protrusions are not formed on the wall portion 223 of the spacer 200 on the plus side in the X axis direction. However, it may be also possible to adopt the configuration where the plurality of protrusions are formed on the wall portion of the spacer 200 on the plus side in the X axis direction. In this case, it is preferable that the plurality of protrusions formed on the wall portion of the spacer 200 on the minus side in the X axis direction protrude more than the plurality of protrusions formed on the wall portion of the spacer 200 on the plus side in the X axis direction. With such a configuration, the energy storage device 100 can be arranged in a state where the energy storage device 100 is disposed close to the plus side of the spacer in the X axis direction (that is, close to the measuring part 740).

In the above-mentioned embodiment, the measuring part 740 is a temperature sensor which measures a temperature as a state of the energy storage device 100. However, the measuring part 740 is not limited to a temperature sensor. For example, the measuring part may be an electric current sensor which measures a charging/discharging state as a state of the energy storage device 100, or may be a voltage sensor which measures a voltage of the energy storage device 100. In this case, the measuring part is disposed so as to be brought into contact with the positive electrode terminal 120 and the negative electrode terminal 130 of the energy storage device 100.

In the above-mentioned embodiment, the opening portion 223a having a notched shape is formed in the wall portion 223 of the spacer 200. However, a shape of the opening portion is not limited to a notched shape, and a spacer may be adopted where an opening portion having a continuous periphery (that is, a through hole) is formed in the spacer. In this case, for example, instead of the configuration where a side surface of the energy storage device 100 on the plus side in the X axis direction is covered by adjacent spacers while being divided in two, the side surface of the energy storage device 100 may be configured to be covered by one spacer. In the case where the side surface of the energy storage device 100 on the plus side in the X axis direction is covered by one spacer, a through hole may be adopted as the opening portion.

In the above-mentioned embodiment, the plurality of protrusions 241 are formed on all of the plurality of spacers 200. However, the plurality of protrusions 241 may be formed only on at least the spacers arranged adjacently to the energy storage devices 100a, 100b each of which has a side surface on which the measuring part 740 is mounted. In this case, in the spacers arranged adjacently to the energy storage devices 100a, 100b, the plurality of protrusions 241 may be formed only on sides of the spacers disposed adjacently to the energy storage devices 100a, 100b.

In the above-mentioned embodiment, the plurality of protrusions 241 are formed on the spacer 200 such that the protrusions 241 are on the wall portion 224 and on the plate-like member 210. However, the present invention is not limited to the above, and the plurality of protrusions 241 may be formed so as to project only from the wall portion 224, may be formed so as to project only from the plate-like member 210, or may be formed so as to project from at least one of the wall portion 221 and the wall portion 222.

In the above-mentioned embodiment, the respective projecting portions 211 to 214, 230 are formed on the spacer 200. However, it may be possible to adopt a spacer where the respective projecting portions 211 to 214, 230 are not formed on the spacer.

In the above-mentioned embodiment, the energy storage apparatus 1 includes the plurality of energy storage devices 100. However, the present invention is also applicable to the energy storage apparatus which includes one energy storage device.

The present invention can be realized not only in the form of such an energy storage apparatus 1 but also in the form of the spacer 200 which the energy storage apparatus 1 includes.

The configurations which are made based on any combination of the respective elements which the above-mentioned embodiment and modifications of the embodiment include are also included in the scope of the present invention.

The present invention is usefully applicable to an energy storage apparatus which includes energy storage devices and spacers disposed on sides of the energy storage devices.

What is claimed is:

1. An energy storage apparatus, comprising:
an energy storage device including an electrode terminal;
a spacer disposed on a side of the energy storage device in a first direction, the spacer including a pair of wall portions; and
a temperature measuring part for measuring a temperature of the energy storage device, the temperature measuring part being disposed on one side of the energy storage device in a second direction which intersects with the first direction, the temperature measuring part being disposed on a surface adjacent to a surface on which the electrode terminal is disposed,
wherein the wall portions include a first wall portion disposed on the one side of the energy storage device in the second direction and a second wall portion disposed on an other side of the energy storage device opposite to the one side of the energy storage device, and
wherein the energy storage device is arranged at a position where a distance between the energy storage device and the first wall portion is set shorter than a distance between the energy storage device and the second wall portion.

2. The energy storage apparatus according to claim 1, wherein an opening portion is formed in the first wall portion at a position where the temperature measuring part is disposed.

3. The energy storage apparatus according to claim 1, wherein the spacer further includes a protrusion arranged at a position where the protrusion is brought into contact with a surface of the energy storage device on the other side of the energy storage device in the second direction.

4. The energy storage apparatus according to claim 3, wherein the protrusion and the temperature measuring part are arranged at positions where the protrusion and the temperature measuring part correspond to each other in the second direction.

5. The energy storage apparatus according to claim 3, wherein the energy storage device comprises a plurality of the energy storage devices,
wherein the spacer includes:
a plate-like member arranged between the energy storage devices; and the wall portions each of which extends from an outer edge of the plate-like member toward the one side and the other side opposite to the one side in the first direction of the energy storage device, and wherein the opening portion is formed in the first wall portion, and the protrusion is formed on the second wall portion.

6. The energy storage apparatus according to claim 1, further comprising:

two binding members for applying a binding force in the first direction between the energy storage device and the spacer, the two binding members being arranged on end portions of an assembled body including the energy storage device and the spacer on one side of the assembled body in the second direction and an other side of the assembled body opposite to the one side of the assembled body in the second direction, wherein a first binding member arranged on the one side of the assembled body in the second direction, out of the two binding members, is arranged on one side of the assembled body in a third direction which intersects with the first direction and the second direction relative to the temperature measuring part, and wherein a second binding member arranged on the other side of the assembled body opposite to the one side of the assembled body, out of the two binding members, is arranged on an other side opposite to the one side in the third direction where the first binding member is arranged.

7. The energy storage apparatus according to claim 6, wherein the first binding member and the second binding member are arranged approximately in point symmetry with respect to a center of the energy storage device.

8. The energy storage apparatus according to claim 1, wherein the temperature measuring part comprises a temperature sensor which measures a temperature of the energy storage device.

9. The energy storage apparatus according to claim 8, wherein the temperature measuring part is brought into contact with a side surface of the energy storage device at a position where the temperature measuring part faces a current collector of the energy storage device.

10. The energy storage apparatus according to claim 9, wherein the temperature measuring part is brought into contact with the side surface of the energy storage device at a position where the temperature measuring part faces in an opposed manner the current collector having a larger resistance out of a positive current collector and a negative current collector which constitute the current collector.

11. The energy storage apparatus according to claim 10, wherein the energy storage device comprises three or more energy storage devices arranged in the first direction, wherein a plurality of the spacers are disposed between the three or more energy storage devices, wherein the temperature measuring part is disposed on one side of an inner energy storage device in the second direction side, the inner energy storage device being arranged on an inner side out of the three or more energy storage devices, and wherein a protrusion is formed on one of the spacers which is brought into contact with the inner energy storage device out of the plurality of spacers.

12. The energy storage apparatus according to claim 1, wherein, in a third direction which intersects with the first direction and second direction, throughout an entirety of the first wall portion, the distance between the energy storage device and the first wall portion is shorter than the distance between the energy storage device and the second wall portion.

13. The energy storage apparatus according to claim 1, wherein, throughout an entirety of the wall portions that extend in the second direction, the distance between the energy storage device and the first wall portion is shorter than the distance between the energy storage device and the second wall portion.

14. The energy storage apparatus according to claim 1, wherein, throughout an entirety of the wall portions that extend in the second direction, the distance between the energy storage device and the first wall portion is constant.

15. The energy storage apparatus according to claim 14, wherein, throughout the entirety of the wall portions that extend in the second direction, the distance between the energy storage device and the second wall portion is constant.

16. The energy storage apparatus according to claim 1, further comprising a current collector, wherein the temperature measuring part contacts with a side surface of the energy storage device at a position where the temperature measuring part faces the current collector.

17. The energy storage apparatus according to claim 1, further comprising a positive current collector and a negative current collector, wherein the temperature measuring part contacts with a side surface of the energy storage device at a position where the temperature measuring part faces whichever of the positive current collector and the negative current collector has a larger resistance.

18. The energy storage apparatus according to claim 1, wherein a plurality of energy storage devices, each including the energy storage device, are arranged in the first direction, wherein a plurality of the spacers, each including the spacer, are disposed between the plurality of energy storage devices, and wherein the temperature measuring part is disposed on one side of an inner energy storage device of the plurality of energy storage devices in the second direction side, the inner energy storage device being arranged on an inner side out of the plurality of energy storage devices.

19. The energy storage apparatus according to claim 18, wherein a protrusion is formed on one of the spacers which contacts with the inner energy storage device.

20. An energy storage apparatus, comprising, an energy storage device;

a spacer disposed on a side of the energy storage device in a first direction, the spacer including a pair of wall portions; and a measuring part for measuring a state of the energy storage device, the measuring part being disposed on one side of the energy storage device in a second direction which intersects with the first direction, wherein the wall portions include a first wall portion disposed on the one side of the energy storage device in the second direction and a second wall portion disposed on an other side of the energy storage device opposite to the one side of the energy storage device, wherein the energy storage device is arranged at a position where a distance between the energy storage device and the first wall portion is shorter than a distance between the energy storage device and the second wall portion, wherein the measuring part comprises a temperature sensor which measures a temperature of the energy storage device, and wherein the measuring part is brought into contact with a side surface of the energy storage device at a position where the measuring part faces a current collector of the energy storage device.

\* \* \* \* \*